United States Patent [19]
Moore

[11] 3,982,669
[45] Sept. 28, 1976

[54] HOT MELT DISPENSING APPARATUS AND METHOD

[75] Inventor: Leo M. Moore, Ashland, Va.

[73] Assignee: Industrial Machine Service Company, Richmond, Va.

[22] Filed: Nov. 20, 1975

[21] Appl. No.: 633,649

[52] U.S. Cl. .................... 222/146 HE; 222/192; 222/262; 222/333; 222/389
[51] Int. Cl.² ............... B67D 5/62; G01F 11/00
[58] Field of Search ............ 222/146 HE, 72, 254, 222/255, 256, 260, 261, 262, 389, 333, 334, 192

[56] References Cited
UNITED STATES PATENTS

| 1,372,071 | 3/1921 | Groetken | 222/318 |
| 2,034,914 | 3/1936 | Lanser | 222/72 X |
| 2,188,848 | 1/1940 | Svenson | 222/72 X |
| 3,113,705 | 12/1963 | Weitzel | 222/389 |
| 3,758,003 | 9/1973 | Kautz et al. | 222/146 HE |

Primary Examiner—Allen N. Knowles
Assistant Examiner—Hadd S. Lane
Attorney, Agent, or Firm—Witherspoon and Lane

[57] ABSTRACT

The apparatus of this invention is designed to dispense material from a container. The container is placed on a base of the apparatus between a pair of hydraulically or pneumatically operated telescoping rods that are secured to the base. A cross bar which bridges the rods is secured to the top end of each rod. This cross bar carries two pump motors and a pair of spaced apart rods. The pair of spaced apart rods are each secured to the cross bar at one end and to a follower plate at the other end. The follower plate is surrounded by wipers and if the material that is to be dispensed must be heated before it can be dispensed, either one of two embodiments of an integrally fabricated combination heater-follower plate with wipers is utilized in place of the follower plate. In addition, optional heat radiating fins may be secured to the bottom of either of the two integrally fabricated combination heater-follower plates, if desired. The apparatus also includes a pump coupler, two pumps, a de-areator system and a reservoir surrounding the de-areator. One of the two pumps is used to pump the material out of the container, through the de-areator and into the reservoir, and the other pump is used to pump the material out of the reservoir. The two pumps are each provided with a slip clutch arrangement to provide a regulated flow of the material being dispensed. The telescoping rods are used to lower the follower plate or the integrally fabricated combination heater-follower plate into the container and permit the follower plate or integrally fabricated combination heater-follower plate to move down inside the container as the material is dispensed from the container.

35 Claims, 12 Drawing Figures

HOT MELT DISPENSING APPARATUS AND METHOD

BACKGROUND OF THE INVENTION

This invention relates to dispensing apparatus; and more particularly, to apparatus for dispensing, de-areating and, if necessary, heating a viscous material.

Various systems for dispensing and for heating and dispensing viscous materials have been devised. Examples of such prior art systems are disclosed in the following U.S. Patents: U.S. Pat. Nos. 2,433,146 to Pyles; 2,630,248 to Hinz; 2,522,652 to Von Haase; 3,282,469 to Skonberg; and 3,412,903 to Van Riper, Jr., et al.

The aforementioned U.S. Pat. No. 2,433,146 to Pyles and U.S. Pat. No. 2,630,248 to Hinz both disclose dispensing apparatus using a follower plate that is lowered into a container of the material to be dispensed. Heating means for heating the material is not disclosed in either of these two patents.

The apparatus disclosed in the other three aforementioned U.S. patents all disclose heating means for changing the material to be dispensed from a solid or unpumpable viscous liquid to a pumpable less viscous liquid. Thus, U.S. Pat. No. 2,522,652 to Von Haase discloses apparatus that includes a heater plate but no follower plate. The apparatus disclosed in U.S. Pat. No. 3,282,469 to Skonberg includes a follower plate and a separate heater plate located below the follower plate and the apparatus disclosed in U.S. Pat. No. 3,412,903 includes a follower plate and a separate heater plate located below and spaced apart from the follower plate.

The apparatus disclosed in the aforementioned Pyles patent and the apparatus disclosed in the aforementioned Hinz patent are both designed to dispense material whose viscosity at normal operating temperatures is such that these materials can be dispensed without the application of heat to the materials to lower the viscosity before dispensing. Therefore, these patents are not concerned with any problems encountered in applying heat to the material to be dispensed. However, a problem that may be encountered with the apparatus of these two patents is the problem of entrapped air in the dispensed material. If air is entrapped in the material in the container, this entrapped air will be present in the form of air bubbles in the material after it is dispensed. These air bubbles entrapped in the material tend to break after the material is dispensed thereby causing voids or unsightly pits in the material. If this dispensed material is being used as a sealing or as insulating material, for example, any voids in the sealing bead of material or the insulating layer of the material cannot be tolerated since the material would not provide a suitable seal or insulator if holes are present. If the dispensed material is covered, pitting of the material is usually of no concern; however, if the dispensed material is visible, these pits caused by the entrapped air are unsightly and therefore, undesirable. Neither the apparatus of the aforementioned Pyles patent nor the apparatus of the aforementioned Hinz patent provide means for de-areating the material before it is dispensed.

As previously noted, the aforementioned Von Haase, Skonberg and Van Riper, Jr., et al, patents all disclose apparatus for dispensing material that requires the application of heat to render the material pumpable. In the apparatus of Skonberg and in the apparatus of Van Riper, Jr., et al, the heater plate and the follower plate are two separate and distinct plates. In the Von Haase apparatus a follower plate, which is desirable in such apparatus, is not provided.

As is the case with dispensing material that is pumpable without the application of heat, entrapped air is a problem encountered in dispensing materials that requires the application of heat to render the materials pumpable. These materials, incidentally, are commonly called hot melt materials. In fact, these hot melt materials, particularly some of the newer hot melt materials, contain a substantial amount of entrapped air. The manner in which these materials are manufactured tends to trap air into the materials. Manufacturers of these materials have expended substantial effort and sums of money attempting to de-areate the material. These attempts have met with little success. Thus, the materials are shipped to the users with a considerable amount of entrapped air and this entrapped air is then present in the materials as they are dispensed from the container. Neither the apparatus of the aforementioned Von Haase patent, nor the apparatus of the aforementioned Skonberg patent, nor the apparatus of the aforementioned Van Riper, Jr., et al patent, provides means for de-areating the material before finally dispensing the material.

Another problem not solved by any of the prior patents aforementioned is the problem of having to discontinue the dispensing operation during container changes. When the material in a container is depleted, a full container is substituted for the empty container. With the prior art apparatus the dispensing operation is temporarily interrupted during the container change over. Still another problem not solved by the apparatus of any of the patents above mentioned is that of continuous uniform flow of the material during dispensing. For materials with a relatively low viscosity it is not too difficult to provide a fairly uniform flow rate. As the viscosity of the material increases, it is difficult to obtain a uniform flow rate and prior art dispensing apparatus such as that disclosed in the aforementioned patents has not been able to provide a continuous uniform flow rate when dispensing viscous materials, particularly when dispensing the highly viscous hot melt materials. Thus, when the material is to be used as a sealant and dispensed in the form of a sealing bead, the bead is very often not uniform. Such a bead is unsightly and in some cases cannot be tolerated.

The apparatus of this invention overcomes the problems mentioned above. With the apparatus of this invention, the material is de-areated before dispensing, and the material is dispensed with a continuously uniform flow rate. Further, the apparatus of this invention provides for uninterrupted flow of the material during container changes and can be used to dispense materials pumpable at normal operating temperatures as well as hot melt materials without the use of a separate heater plate. The follower and heating means are fabricated as one integral unit.

SUMMARY OF THE INVENTION

The apparatus of this invention provides an improved system for dispensing material from a container. A first pump is provided to pump the material out of its container, through a de-areator and into a reservoir that surrounds the de-areator. A second pump then pumps the de-areated material out of the reservoir through, for example, a hose and nozzel or gun arrangement. Both pumps are provided with a slip clutch arrangement to maintain a regulated pump pressure and therefore a uniform flow of the material through the apparatus.

The apparatus further includes a follower plate with wipers, or for hot melt materials, an integrally fabricated combination heater-follower plate with wipers. Two embodiments of the integrally fabricated heater-follower plate are disclosed. The follower plate or integrally fabricated combination heater-follower plate is lowered into the container from which the material is to be dispensed by a pair of telescoping rods. The telescoping rods permit the follower plate or the integrally fabricated combination heater-follower plate, as the case may be, to move down into the container as the material is dispensed from the container so that follower plate or combination heater-follower plate always rests on the top surface of the material and applies some pressure on the material.

If a combination heater-follower plate is utilized, optional heat radiating fins may be secured to the bottom surface of the combined heater-follower plate. If heat need not be applied to the material that is to be dispensed, only a follower plate need, of course, be utilized. However, the combination heater-follower plate can be used to dispense any material and is therefore more versatile. If no heat is required, the heating of the combined heater-follower plate merely remains de-energized.

The reservoir surrounding the de-areator is of such size that the material can be pumped from the reservoir even during container changes. To change containers, the follower plate or combined heater-follower plate, as the case may be, is raised out of the empty container, the container is then removed from a base or platform provided with the apparatus and a full container is placed on the base or platform. When the full container is in place, the follower plate or combined heater-follower plate is lowered into the full container onto the top surface of the material in the container. During this container changing operation, the reservoir contains enough material to provide for continuous dispensing of the material by the second pump. Thus, container changing does not interrupt the dispensing operation.

BRIEF DESCRIPTION OF THE DRAWING

A complete understanding of the structural details of the invention and the operation thereof can be obtained from the following detailed description when read in conjunction with the annexed drawing in which like parts in the various Figures have like numerals and in which.

DETAILED DESCRIPTION OF THE INVENTION

Figure 1:
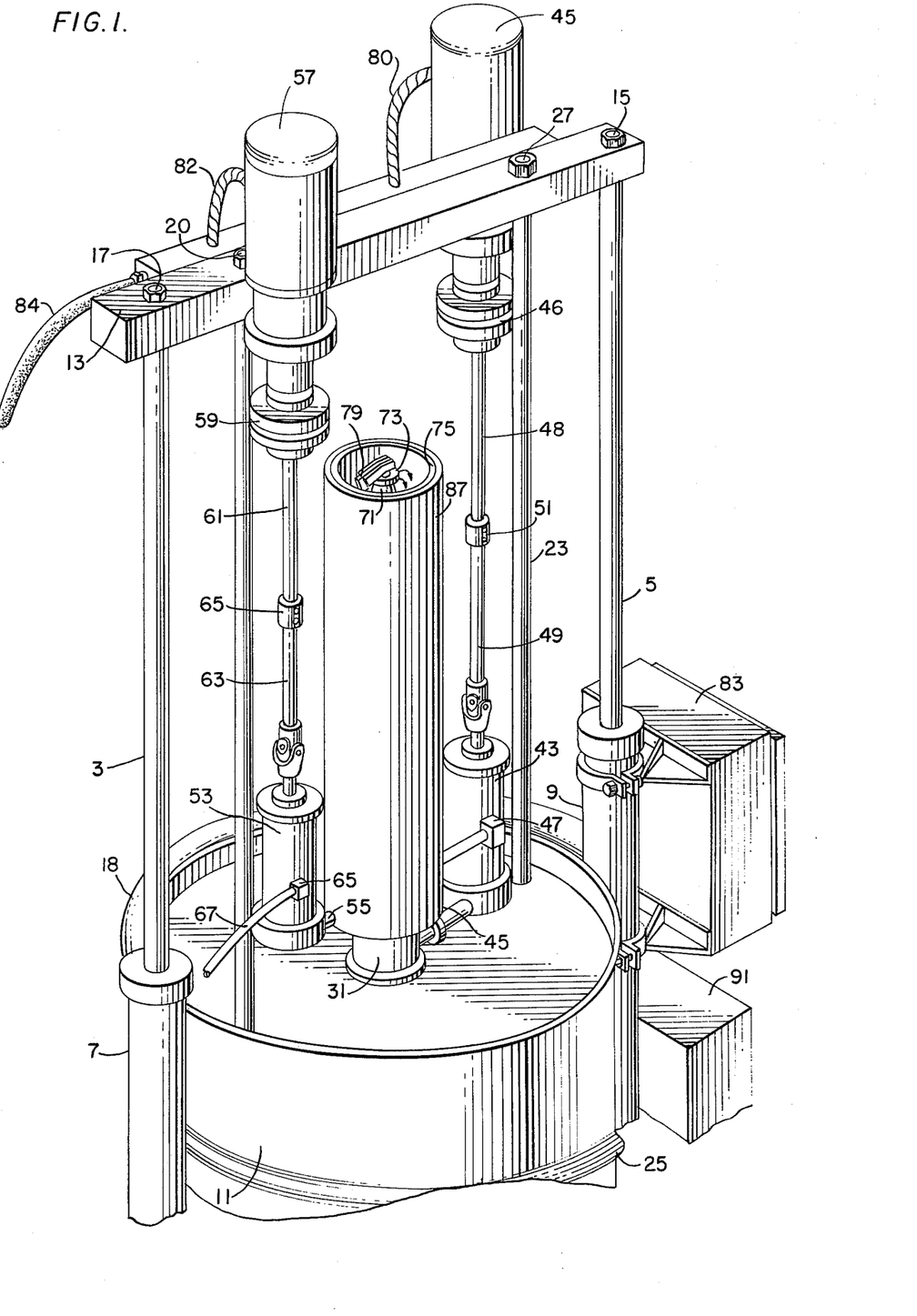
FIG. 1 is a partial perspective view of a preferred embodiment of the invention.
Figure 2:
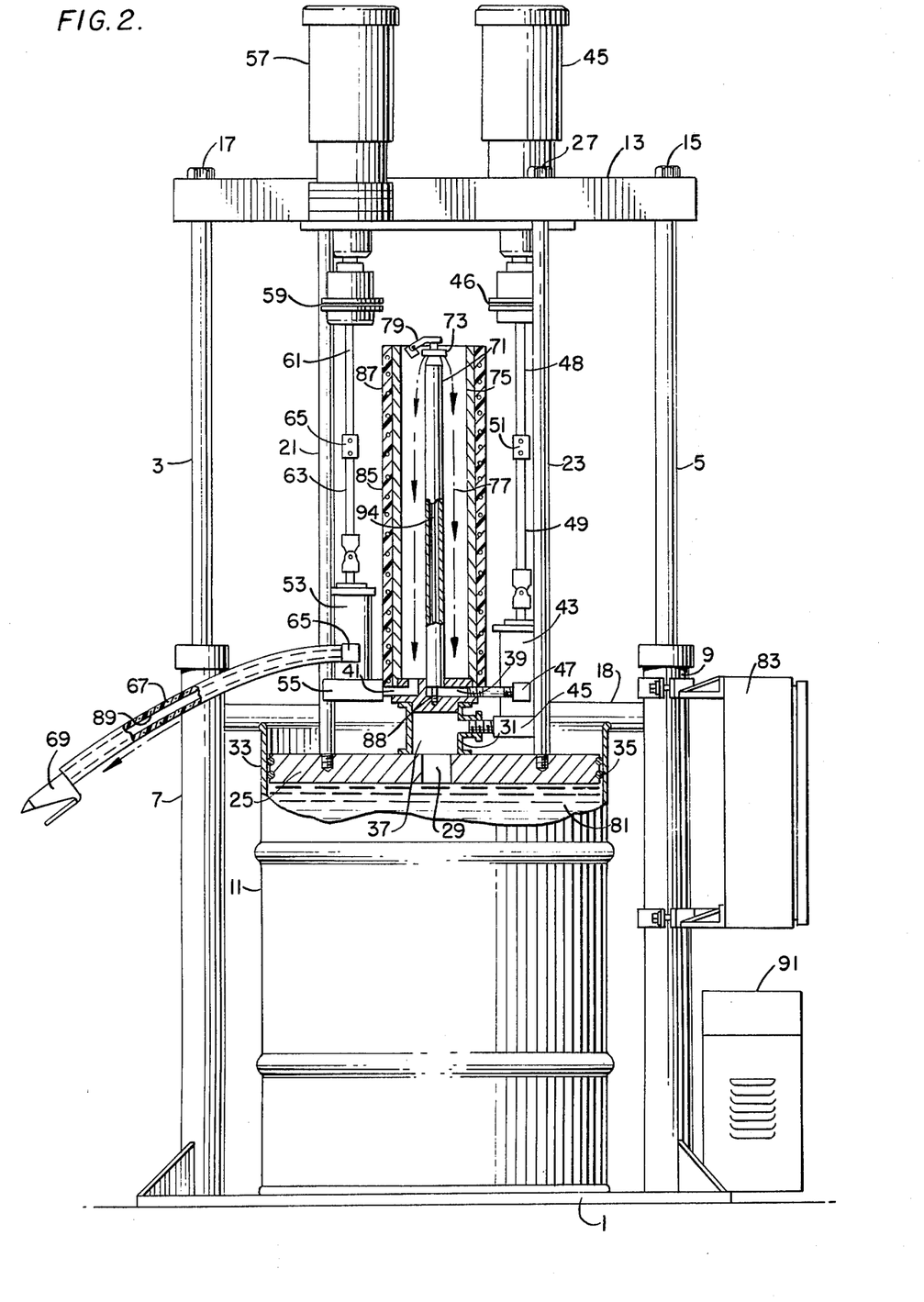
FIG. 2 is an overall view of the preferred embodiment with some of the structural elements shown in cross-section.

Referring to FIGS. 1 and 2, the dispensing apparatus of this invention includes a basic frame or support structure which comprises a base or platform 1, a first vertical telescoping rod 3 and a second vertical telescoping rod 5. Telescoping rod 3 telescopes in and out of the cylindrical sleeve 7 which is secured to base 1 adjacent one edge of base 1. Similarly, telescoping rod 5 telescopes in and out of the cylindrical sleeve 9 which is secured to base 1 adjacent the edge of base 1 opposite the edge adjacent to sleeve 7. Sleeves 7 and 9 are so positioned and secured to base 1 so as to provide a space between the sleeves of sufficient size to permit a conventional drum 11 to be placed on base 1 between sleeves 7 and 9.

A cross bar or support frame 13 forms a bridge across the top of telescoping rods 3 and 5. Cross bar 13 is secured to the top end of each of the telescoping rods 3 and 5 by any suitable means such as the nuts 15 and 17 or by welding. If nuts 15 and 17 are used, the top ends of each of the telescoping rods 3 and 5 are reduced somewhat in diameter and threaded, and holes are provided in cross bar 13 to slip cross bar 13 over telescoping rods 3 and 5. Nuts 15 and 17 are then threaded on telescoping rods 3 and 5 respectively. Another cross member 18 is connected at one end to sleeve 7 and at the other end to sleeve 9. Telescoping rods 3 and 5 are moved in and out of sleeves 7 and 9 respectively either hydraulically or pneumatically.

One end of a first cylindrical rod 21 is secured to cross bar 13 by any suitable means such as by providing threads on the end of rod 21, slipping the rod through a hole in cross bar 13 and fastening the nut 20 to rod 21. The other end of cylindrical rod 21 is threaded and is secrewed into a threaded hole provided in the follower plate 25. Follower plate 25, as will be described more fully is just a follower plate or, if necessary, is an integrally fabricated combination heater-follower plate. A second cylindrical rod 23 spaced apart from rod 21 also has one end secured to cross bar 13 by any suitable means such as by the nut 27 and has its other end threaded into a second threaded hole provided in follower plate 25. Thus, cylindrical rods 21 and 23 suspend follower plate 25 from cross bar 13 and follower plate 25 will therefore move up and down as telescoping rods 3 and 5 are moved in and out of sleeves 7 and 9, respectively.

A pair of resilient wipers 33 and 35 encircle follower plate 25. Resilient wipers 33 and 35 are tubular shaped and made from any suitable resilient material. Grooves are cut into the edge of follower plate 25 and resilient wipers 33 and 35 fit into these grooves such that wipers 33 and 35 extend beyond the edge of follower plate 25.

a pump coupler 31 having a first chamber 37, a second high pressure chamber 39 and a third chamber 41 is secured to the top of follower plate 25 by any suitable means. A hole 29 cut through the center of follower plate 25 communicates with chamber 37 of coupler 31. A first pump 43 has its inlet 45 connected to coupler 31 such that inlet 45 communicates with chamber 37 of coupler 31 and has its outlet 47 connected to coupler 31 such that outlet 47 communicates with high pressure chamber 39 of coupler 31. Pump 43 is driven by a first pump motor 45 through a slip clutch 46 and a pair of shafts 48 and 49 connected together by a coupler 51. Pump motor 45 is attached to cross bar 13 by any suitable means.

A second pump 53 has its inlet 55 connected to coupler 31 such that inlet 55 communicates with chamber 41 of coupler 31. Pump 53 is driven by a second pump motor 57 through a second slip clutch 59 and a pair of shafts 61 and 63 connected together by the coupler 65. Pump motor 57 is attached to cross bar 13 by any suitable means. The outlet 65 of pump 53 is connected to the dispensing hose 67. Dispensing hose 67 couples outlet 65 of pump 53 to a dispensing gun or nozzle 69.

A vertical high pressure standpipe 71 is connected to coupler 31 such that high pressure standpipe 71 communicates with high pressure chamber 39 of coupler 31. A de-areator cap 73 is secured to the top of 71. The structural details of de-aerator cap 73, how it is secured to standpipe 71, and its function will be more fully described later herein.

A second standpipe 75 also secured to coupler 31 surrounds high pressure standpipe 71 thereby forming a reservoir 77 between the outer wall of standpipe 71 and the inner wall of standpipe 75. Reservoir 77 communnicates with chamber 41 of coupler 31 and therefore with inlet 55 of pump 53. An overflow valve 79 is secured to the top of de-areator cap 73 and projects into reservoir 77.

As will become more apparent, the apparatus of this invention, as described above, is designed to dispense the material 81 stored in drum 11 out of drum 11 through gun or nozzle 69. If material 81 is pumpable without the application of heat, the apparatus as thus far described functions to dispense material 81 out of drum 11. A control box 83 secured to sleeve 9 is provided to control the operation of the apparatus. Further, if it is not necessary to apply heat to material 81, follower plate 25 is just a follower plate. This follower plate is shown in more detail in FIGS. 3 and 4. On the other hand, if heat must be applied to material 81 to render it pumpable and therefore dispensable, th integrally fabricated combination heater-follower 2 shown in FIGS. 5 and 6 or the integrally fabricated combination heater-follower plate 10 shown in FIGS. 7 and 8 is substituted for follower plate 25. Integrally fabricated combination heater-follower plates 2 and 10 will be described in more detail later herein. In addition, if material 81 must be heated before it can be dispensed, it is preferable to not only apply heat to material 81 while it is in drum 11 by means of integrally fabricated heater-follower plates 2 or 10, but to also apply heat to material 81 while it is in reservoir 77 and to apply heat to hose 67. Heat is applied to material 81 while it is in reservoir 77 by means of the heating wire 85 which is wrapped around standpipe 75. Heating wire 85 is covered by a heat insulating jacket 87. Electricity for heating wire 85 is supplied from control box 83. While heat can be applied to hose 67 by any suitable means, applicant prefers to heat hose 67 by means of a heater wire 89 inbedded in hose 67. The control box 91 which may be free standing or may be secured to base 1 is used to apply and control the heat applied to hose 67 by heating wire 89.

Figure 3:
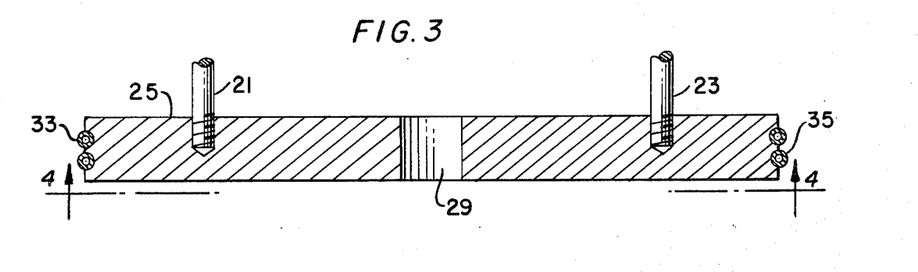
FIG. 3 is a cross-section view of a follower plate constructed in accordance with this invention.
Figure 4:
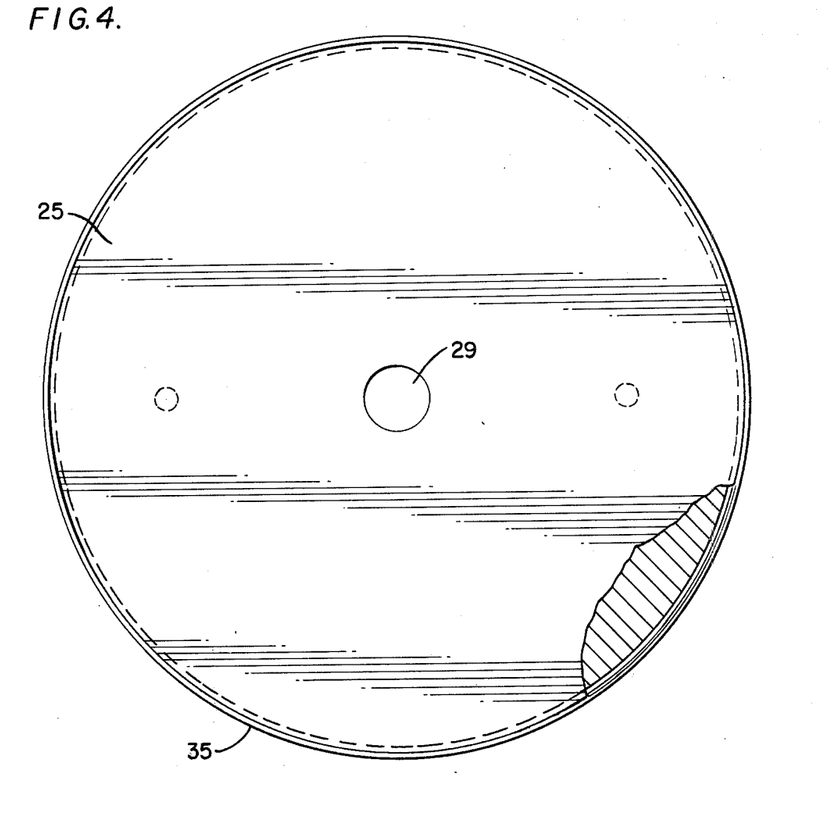
FIG. 4 is a bottom view of the follower plate of FIG. 3.

Referring now to FIGS. 3 and 4, FIG. 3 is a cross-section view of follower plate 25 and FIG. 4 is a bottom view of follower plate 25. As shown in FIGS. 3 and 4, follower plate 25 is nothing more than a circular disc of metal, aluminum for example, having hole 29 cut through its center. A pair of holes are cut into the top surface of follower plate 25 and then threaded to receive rods 21 and 23, only a portion of which are shown in FIG. 3. Wipers 33 and 35 surround follower plate 25 and fit into grooves cut into the edge of follower plate 25. Thus, follower plate 25 is merely a conventional follower plate of the type utilized in prior art dispensing apparatus.

Figure 5:
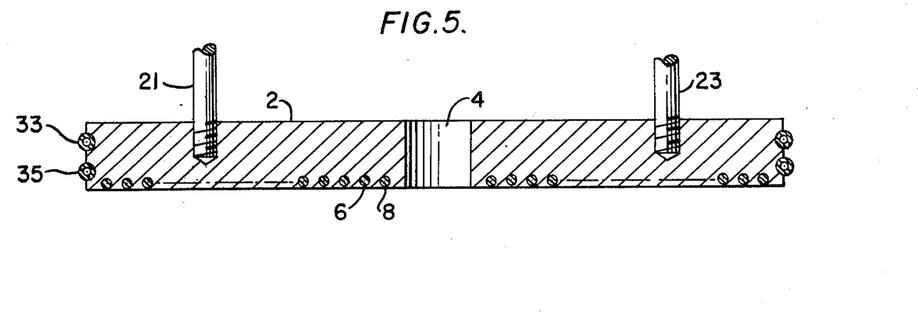
FIG. 5 is a cross-section view of a first embodiment of an integrally fabricated combination heater-follower plate constructed in accordance with this invention.
Figures 6, 9:
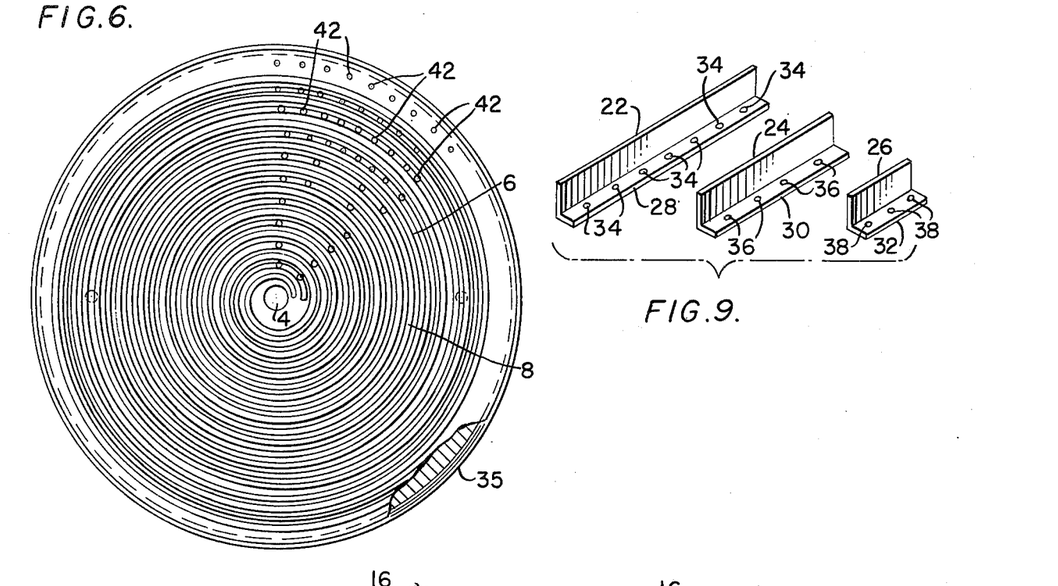
FIG. 6 is a bottom view of the integrally fabricated combination heater-follower plate of FIG. 5.
FIG. 9 shows heat radiating fins that may be used with either of the two integrally fabricated combination heater-follower plates.
Figure 7:
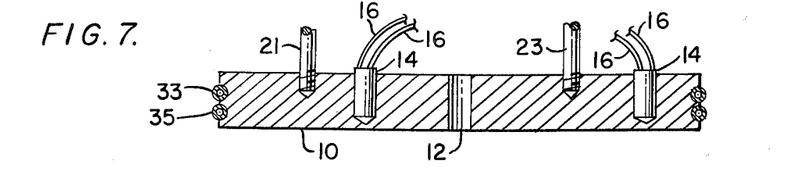
FIG. 7 is a cross-section view of a second embodiment of an integrally fabricated combination heater-follower plate constructed in accordance with the invention.
Figure 8:
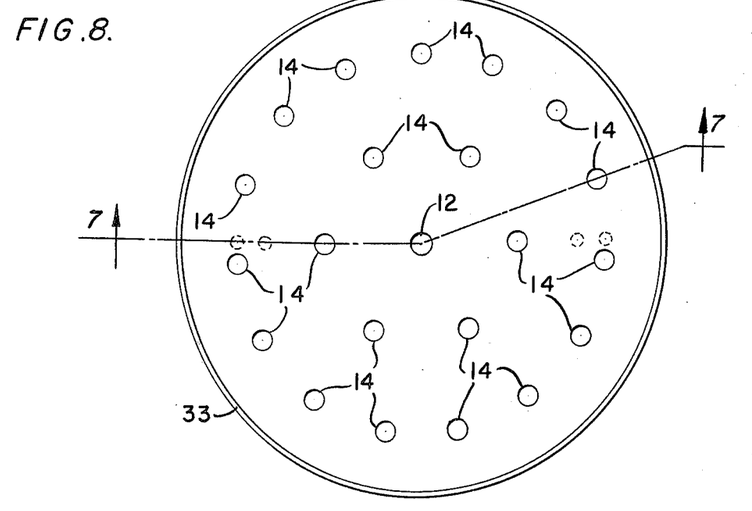
FIG. 8 is a top view of the integrally fabricated combination heater-follower plate of FIG. 7.

If heat must be applied to material 81 to render material 81 dispensable, integrally fabricated heater-follower plate 2 shown in FIGS. 5 and 6, or integrally fabricated combination heater-follower plate 10 shown in FIGS. 7 and 8, is substituted for follower plate 25. FIG. 5 is a cross-section view of integrally fabricated heater-follower plate 2 and FIG. 6 is a bottom view of integrally fabricated heater-follower plate 2. As shown in FIGS. 5 and 6, heater-follower plate 2 is also a circular disk of metal, aluminum for example, having a hole 4 cut through the center thereof. Also, a pair of holes are cut into the top surface of integral heater-follower plate 2 and then threaded to receive rods 21 and 23. Only a portion of rods 21 and 23 are shown in FIG. 5. It should be noted that instead of threading rods 21 and 23 into the holes cut into the top heater-follower plate 2, rods 21 and 23 could be secured by any other means such as by welding. Of course, rods 21 and 23 could also be welded in place on follower plate 25. A pair of spiral grooves are cut into the bottom surface of heater-follower plate 2 and the heater wires 6 and 8 are pressed into these grooves. While heater wires 6 and 8 could merely be tightly press fit into the grooves provided in the bottom surface of heater-follower plate 2, it is preferable to provide some retaining means such as straps (not shown) across the grooves to hold wires 6 and 8 in place, due to the fact that wires 6 and 8 will expand when heated and when expanded will tend to spring out of the grooves cut into the bottom surface of heater-follower plate 2. Any suitable means can be used to retain wires 6 and 8 in place. Wires 6 and 8 are of such size relative to the depth of the grooves in which wires 6 and 8 are seated that wires 6 and 8 are essentially flush with the bottom surface of heater follower plate 2. Electricity to heat wires 6 and 8 is supplied from control box 83.

While integrally fabricated combination heater-follower plate 2 provides a suitable one piece heater-follower plate that operates very satisfactorily, if either or both heater wires 6 and 8 burn out, combination heater-follower plate 2 must be removed from the apparatus and a new heater wire put in place for the burnt out heater wire. The integrally fabricated combination heater-follower plate 10 shown in FIGS. 7 and 8 overcomes this problem and for this reason integrally fabricated combination heater-follower plate 10 is the preferred embodiment.

As shown in FIGS. 7 and 8 combination heater-follower plate 10 is also a circular disk of metal, aluminum for example, with a hole 12 in the center thereof.

Again, a pair of threaded holes are provided to secure rods 21 and 22 to combination heater-follower plate 10 and wipers 33 and 35 surround combination heater-follower plate 10.

Heat is supplied by means of a plurality of cartridge heaters 14 inserted into holes drilled into the top surface of combination heater-follower plate 10. FIG. 8 shows twenty-one of the cartridge heaters 14 and shows these twenty-one heaters 14 arranged in a particular pattern. This number and arrangement of cartridge heaters 14 is not critical. However, a number of heaters 14 sufficient to provide the needed heat must be provided and these heaters should be, for optimum performance, arranged to provide reasonably uniform overall heating. The number and arrangement shown in FIG. 8 does provide satisfactory heating. It should also be noted that, while the precise number of cartridge heaters is not critical, the number provided should be a mulitiple of three since these heaters are preferably energized by three-phase alternating current, with an equal bank of heaters being energized by each phase to provide uniform loading of the three-phase source. Thus, if twenty-one cartridge heaters 14 are provided as shown in FIG. 8, seven of these heaters will be energized by the first phase, another seven will be energized by the second phase, and the last seven will be energized by the third phase of a three-phase source. Each heater is provided with a pair of electrical leads 16 (FIG. 7) to connect the heaters to the electrical supply through control box 83. To avoid cluttering, these electrical leads are not shown in FIG. 8.

If one or more of the cartridge heaters 14 burn out or malfunction, combined heater-follower plate 10 does not have to be removed from the rest of the apparatus, or from the drum 11 if the apparatus is in use, to replace the defective heater or heaters. The defective heater 14 is merely disconnected and lifted out of its hole and new heater 14 is dropped into the hole and connected to the power source. Such an exchange can be very quickly accomplished. Thus, it is apparent that replacement of a defective heating element in combined heater-follower plate 10 is not nearly as cumbersome as the replacement of either or both heater wires 6 and 8 of combined heater-follower plate 2.

Figure 10:
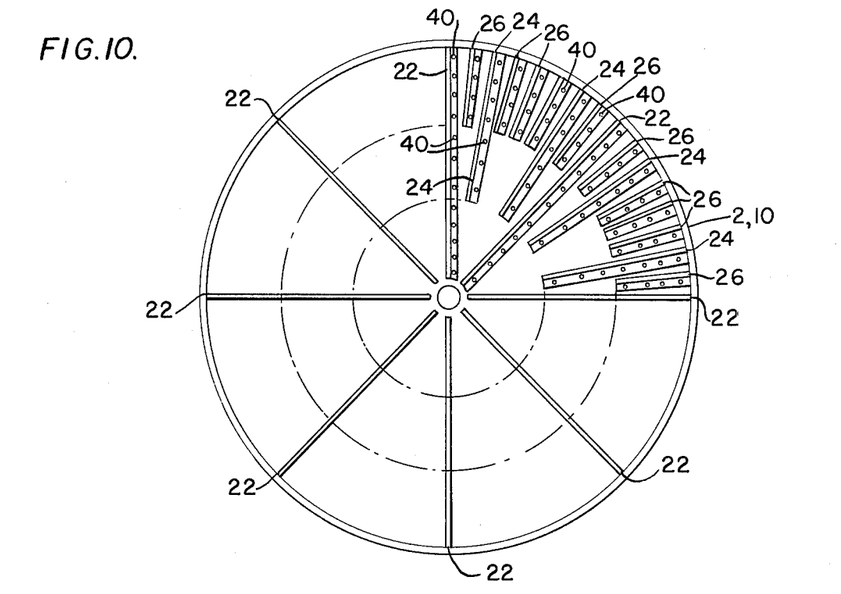
FIG. 10 shows the preferred manner in which the heat radiating fins of FIG. 9 are secured to the two integrally fabricated combination heater-follower plates.

While integrally fabricated combination heater-follower plates 2 and 10 will provide sufficient heat to material 81 when heat is required to reduce the viscosity of material 81, applicant has found it desirable, but not absolutely necessary, to add heat radiating fins to the bottom of combined heater-follower plate 2 and to the bottom of combined heater follower plate 10. Heat radiating fins constructed in accordance with this invention are shown in FIG. 9. Three heating radiating fins of different lengths, the fins 22, 24 and 26, are shown in FIG. 9. Fin 24 is approximately two-thirds as long as fin 22 and fin 26 is approximately one-third as long as fin 22. A short right angle lip 28 is formed in fin 22; a short right angle lip 30 is formed in fin 24; and a short right angle lip 32 is formed in fin 26. A plurality of holes 34, 36 and 38 are drilled into right angle lips 28, 30 and 32 respectively. Fins 22, 24 and 26 are mounted to the bottom of both combined heater-follower plates 2 and 10 by means of the bolts 40 as shown in FIG. 10. Since fins 22, 24 and 26 are mounted to both embodiments of the combined heater-follower plate in the same manner and preferably in the same configuration, FIG. 10 is to be considered as representing the bottom of either combined heater-follower plate 2 or the bottom of combined heater-follower plate 10 as is indicated in FIG. 10. A plurality of properly spaced threaded holes are cut into the bottom surface of both of the combined heater-follower plates to receive the bolts 40, thereby securing the fins in place. Some of these holes, the holes 42, provided in the bottom surface of combined heater-follower plate 2 are shown in FIG. 6. Identical holes (not shown) are provided in the bottom surface of combined heater-follower plate 10.

As will become apparent, heat radiating fins 22, 24 and 26 are arranged in a repetitive pattern on the bottom surface of both heater-follower plates 2 and 10; therefore, FIG. 8 shows only a part of the total fin pattern. As shown in FIG. 8, eight of the long heat radiating fins, the fins 22, are equally spaced around the bottom surface of the combined heater-follower plate, thereby dividing the bottom surface into eight equal segments. Heat radiating fins 24 and 25 are arranged between these long fins in the following pattern: A heat radiating fin 26 followed by a heat radiating fin 24, followed by three heat radiating fins 26, followed by a heat radiating fin 24 followed by a heat radiating fin 26. This pattern is repetitive between all of the heat radiating fins 22. Only two of the complete patterns are shown in FIG. 8. While the specific pattern of heat radiating fins is not critical, it has been found that this pattern or a similar pattern provides the best operative results as will be described in more detail later herein. Further, as has been mentioned, heat radiating fins 22, 24, 26 are not absolutely necessary and therefore are optional. Combined heater-follower plates 2 and 10 can be used without these fins. However, the use of heat radiating fins is desirable in most instances since these fins do provide additional heating surfaces. Heat radiating fins 22, 24 and 26 can be made from any suitable metal that is a good conductor of heat, aluminum, for example.

Figure 11:
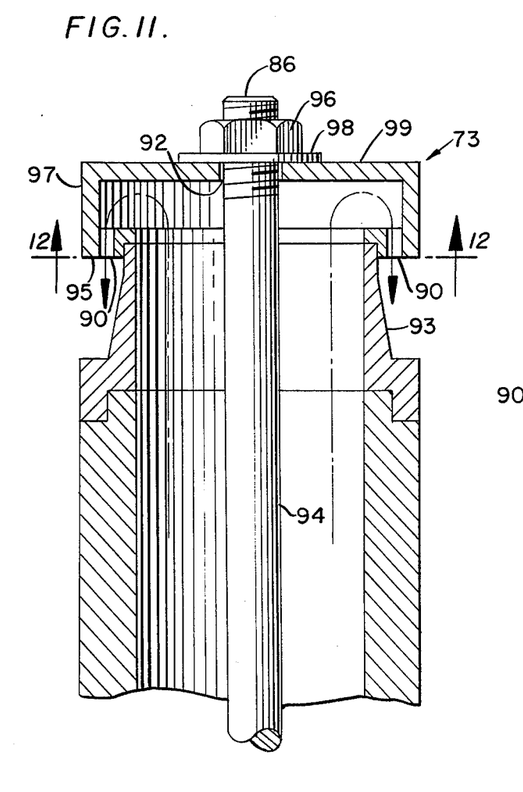
FIG. 11 is a cross-section view of the de-aerator cap of the invention.
Figure 12:
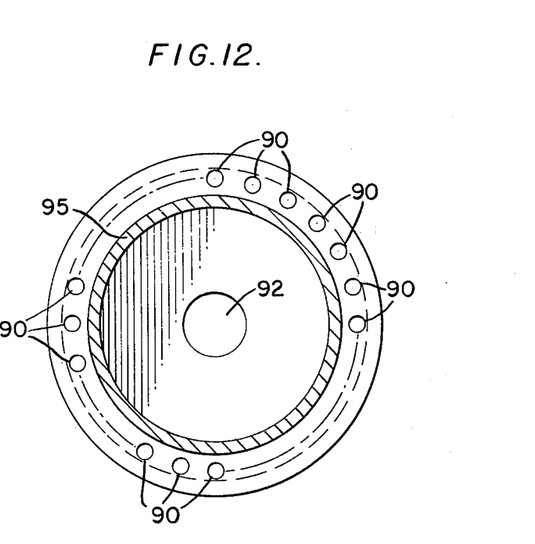
FIG. 12 is a bottom view of the de-areator cap.

Referring now to FIGS. 11 and 12, these figures show de-areator cap 73 in detail. As shown in FIG. 11, de-areator cap 73 has vertical section 93 that has essentially the same inside and outside diameter as the inside and outside diameter of high pressure standpipe 71 in the area where it mates with high pressure standpipe 71. The outside diameter of vertical section 93 then gradually narrows going toward the top of de-areator cap 73 with the inside diameter remaining essentially constant. At the narrowest point of vertical section 93, de-areator cap 73 has a bottom wall 93 that extends at approximately right angles to vertical section 93 and then a vertical wall 97 that extends at approximately a right angle to bottom wall 95 and then a top cap or cover 99 completes the structure. Bottom wall 95 of de-areator cap 73 has a plurality of holes equally spaced around its entire circumference as is more clearly shown in FIG. 12. Top cover 99 has a hole 92 in the center thereof as is more clearly shown in FIG. 12. A rod 94 threaded at its ends 88 and 86 extends the full length of high pressure standpipe 71 (see FIG. 2) and through hole 92 in de-aerator cap 73. The lower end 88 of rod 94 is screwed into a threaded hole provided in coupler 31 as shown in FIG. 2. A nut 96 with a washer 98 is threaded onto threaded upper end 86 of rod 94 to detachably secure de-aerator cap 73 to high pressure standpipe 71.

De-aerator cap 73 is preferably detachably secured to high pressure standpipe 71 so that de-aerator cap 73 can be removed and cleaned when necessary. Similarly, rod 94 is preferably secured to coupler 31 at its lower end 88 by providing threads on end 88 and by providing a threaded hole in coupler 31. Rod 94 could be welded to coupler 31 but could not then be removed for cleaning. In this respect, all the various elements are preferably detachably secured so that any element can be removed for cleaning, repairing and/or replacement. For example, coupler 31 preferably has a plurality of holes drilled into its rim and follower plate 25 and combined heater-follower plates 2 and 10 have mating threaded holes drilled into their top surfaces to secure coupler 31 to these plates by means of bolts. These bolts are not shown in any of the various figures since coupler 31 can be secured by any suitable means and the specific manner in which coupler 31 or any element for that matter is secured is not critical to the invention. However, as previously mentioned, in order to facilitate cleaning, repairing and/or replacement, it is preferable to have all the elements detachably secured so that they can be readily attached and detached.

In the various figures, the specific interconnections between control box 83 and control box 91 are not shown. FIG. 1 does show a part of the cable 84 and the cables 80 and 82 but does not show the specific interconnections of these cables with either control box 83 or control box 91. These interconnections with the control box 83 and 91 are not shown because any suitable control and power connections, arranged in the best workmanshiplike mannner, can be utilized. How such specific control and power connections could be provided is well within the knowledge of one skilled in the art and these specific control and power connections do not form a part of this invention. Thus, any suitable interconnections can be used to supply electricity to the various heating elements from control boxes 83 and 91 and to pump motors 45 and 57. Pump motors 45 and 57, incidently, can be air driven motors but are preferably well known electric motors. If electric motors, electricity will, of course, have to be supplied to motors 45 and 57 and if air motors, a supply of air will have to be connected to motors 45 and 57. In this respect, if telescoping rods 3 and 5 are pneumatically operated, an air supply will also have to be connected to this mechanism. If telescoping rods 3 and 5 are hydraulically operated, the proper fluid control connections will have to be provided to control box 83. Further, while pumps 43 and 53 can be any suitable well-known pumps, applicant has found that well-known gear pumps are preferable. Therefore, pumps 43 and 53 are preferably, gear pumps. It is again stressed that the specific control and power connections do not form a part of this invention and that the manner in which these interconnections would be accomplished will be obvious to those skilled in the art.

In the following description of the operation of the apparatus of this invention it will be assumed that material 81 in drum 11 is a hot melt meterial and that therefore heat must be applied to material 81 to render material 81 pumpable. Under this condition follower plate 25 of FIGS. 1 and 2 will be replaced by either combined heater-follower plate 2 or by combined heater-follower plate 10; specifically, it will be assumed that combined heater-follower plate 10, which is the preferred embodiment, will be used and that fins 22, 24 and 26 have been secured to the bottom of combined heater-follower plate 10 in the manner shown in FIG. 10. The replacement of follower plate 25 by combined heater-follower plate 10 is of course just a direct replacement since the overall shape of follower plate 25 and combined heater-follower plates 2 and 10 is identical. Further, while it is to be assumed in the following description of the operation that combined heater-follower plate 10 is utilized, as will become obvious, the operation of the apparatus is identical when either combined heater-follower plate 2 or combined heater-follower 10 is utilized and is identical when just follower plate 25 is utilized except that no heat is provided when follower plate 25 is used because follower plate 25 is utilized only when the heating of material 81 is not required.

Assuming then that combined heater-follower plate 10 is being utilized, the operation of the apparatus is as follows: Telescoping rods 3 and 5 are raised such that combined heater-follower plate 10 is raised to a height sufficient to allow drum 11 with material 81 contained therein to be put in place on base 1. Drum 11 is normally provided with a top cover or lid which is, of course, removed before drum 11 is put in place on base 1. After drum 11 is in place, telescoping rods 3 and 5 are lowered until combined heater-follower 10 rests on the top surface of material 81. More precisely, the fins 22, 24 and 26 initially rest on the top surface of material 81 since it is assumed that these optional fins are being utilized. Fins 22, 24 and 26 not only rest on top of material but actually apply pressure on material 81 since the hydraulic or pneumatic system controlling telescoping rods 3 and 5 is essentially operating at this point such that if material 81 were not present, combined heater-follower plate 10 would drop to its lowest level. After combined heater-follower plate 10 is lowered in to drum 11 and onto the top surface of material 81, cartridge heaters 14 are energized to apply heat to material 81. At this same time or later, as will be pointed out, heater wire 85 surrounding standpipe 75 and heater wire 89 in hose 67 can also be energized.

The application of heat to material 81 lowers the viscosity of material thereby converting material 81 to a liquid if it is a solid, or to a less viscous liquid if material 81 is a liquid. For most common hot melt materials heat need be applied for only a short period of time for material 81 to become a liquid of pumpable viscosity. As material 81 is heated, combined heater-follower plate 10 will move down into drum 11 to the point where the heated material will flow between the fins 22, 24 and 26 and touch the bottom surface of combined heater-follower plate 10. At this point, pump motor 45 is energized and slip clutch 46 is engaged to operate pump 43. Slip clutch 46 is a known type of slip clutch having two sections or halves. One of the two halves, the upper half in FIGS. 1 and 2, is coupled to and driven by pump motor 45. The other of the two halves of slip clutch 46, the lower half in FIGS. 1 and 2, is coupled to pump 43. When slip clutch 46 is engaged, the two halves are engaged; therefore, if pump motor 45 is running and slip clutch 46 is engaged, pump 43 will be operating since the lower half of slip clutch 46 which is coupled to pump 43 is now being driven by the upper half of slip clutch 46. Conversely, if slip clutch 46 is disengaged, the two halves are not engaged and pump 43 will not be operative eventhough pump motor 45 is running and driving the upper half of slip clutch 46. When the slip clutch 46 is engaged and pump motor 45 is running, slip clutch 46, due to its slipping action, maintains a constant torque on pump 43 and therefore the pump pressure of pump 43 is maintained at a substantially constant valve. Pump 43 when operative pumps heated material 81 out of drum 11 through hole 12 in combined heater-follower plate 10, into and through chamber 37 of coupler 31 and into pump inlet 45. Heated material 81 then passes through pump 43 and is pumped out of pump 43 into high pressure chamber 39 of coupler 31 and up through high pressure standpipe 71 to de-areator cap 73. When heated material 81 under high pressure reaches de-areator cap 73 it passes through the holes 90 of de-areator cap 73 to a low pressure and falls down into reservoir 77 between standpipe 71 and standpipe 75 as is indicated by the arrows in FIG. 2. The material dropping into reservoir 77 is de-areated. Heated material 81 is under high pressure in high pressure standpipe 71. As material 81 passes through holes 90, it is rapidly exposed to a lower pressure due to the fact that reservoir 77 is at or near atmospheric pressure. Rapidly exposing heated material 81 to this lower pressure in reservoir 77 causes the high pressure bubbles in material 81 to burst. In fact, in operation, one can actually hear the air, in effect, bursting out of material 81 as it passes through holes 90 from the high pressure environment in standpipe 71 to the lower pressure environment in reservoir 77.

Repeated operation of the apparatus has shown that de-aerator cap 73 operates very effectively to remove the air from material 81. However, continuous effective de-aeration is accomplished only if the pressure on material 81 in standpipe 71 is maintained at a relatively high value as compared to the pressure in reservoir 77, the pressure in reservoir 77 being at a near atmospheric pressure. If the top of standpipe 75 is open as shown in the drawing, the pressure in reservoir 77 is essentially equal to the surrounding atmospheric pressure. If a cover is placed over the top of standpipe 75, the pressure in reservoir 77 may be slightly above atmospheric pressure.

High pressure is continuously maintained in standpipe 71 by keeping the pump pressure of pump 43 at a relatively high constant pressure. As mentioned, constant pump pressure is achieved by means of the constant torque applied by slip clutch 46. The slipping action of slip clutch provides a constant torque on pump 43 and therefore a constant pump pressure is maintained. The torque provided by slip clutch 46 is sufficiently high to maintain the pump pressure of pump 43 at a relatively high value and the slipping action of slip clutch 46 maintains this high pump pressure at a substantially constant value. Of course, an absolute fixed constant value of the high pressue is not necessary to obtain proper continuous de-aeration. All that is required is that a high pressure relative to the pressure in reservoir 77 be maintained in standpipe 71. However, by maintaining a constant high pump pressure and thus uniform flow rate of material 81, one is assured that a high pressure is maintained in standpipe 71 at all times. If the flow rate varies because the pump pressure varies, the pressure in standpipe 71 will fluctuate and during the valleys in these fluctuations, the pressure in standpipe 71 could drop below the level at which de-aeration is assured. Thus, a constant high pressure is desirable and slip clutch 46 provides this constant high pressure by providing a constant torque on pump 43.

If heater wire 85 surrounding standpipe 75 has not been previously energized, it is energized as material 81 begins to pass through de-areator cap 73 so that material 81 will remain heated while it is stored in reservoir 77 thereby insuring that material 81 will remain at the desired degree of viscosity.

After a small amount of material 81 has accumulated in reservoir 77, the apparatus is ready to dispense material 81 out of reservoir 77 through gun 69 or through whatever other dispensing apparatus is provided. Gun 69 is shown by way of example only since it does not form a part of the invention and since any other suitable dispenser could be used. To dispense material 81 out of reservoir 77, pump motor 57 is energized and slip clutch 59 is engaged to operate pump 53. Actually, pump motor 57 can be energized and slip clutch 59 can be engaged at the same time pump motor 45 is energized and slip clutch 46 is engaged since pump motor 53 will not operate when gun 69 is closed eventhough pump motor 57 is energized and slip clutch 59 is engaged. Slip clutch 59 due to its slipping action provides a constant torque on pump 53. With gun 69 closed, pump 53 will stall against the constant pressure in hose 67 due to the constant torque slipping action of slip clutch 59 until gun 69 is opened. After gun 69 is opened, the slipping action of slip clutch 59 will continue to apply a constant torque on pump 53 as it operates to deliver material through gun 69. Thus, the stall pressure and operating pressure of pump 53 are approximately equal. Therefore, since pump 53 operates only when material 81 is being dispensed out of the system, pump motor 57 with slip clutch 59 engaged can be and preferably is kept running at all times. Of course, if gun 69 is to remain closed for some extended period of time, it may be desirable to cut off both pump motors with just the heating apparatus operative.

As will be described later, the constant torque feature of slip clutch 59 is an important feature of the invention, since this constant torque provides for constant pump pressure and therefore uniform flow of material 81 out of gun 69.

To dispense material 81 out of reservoir 77, pump 53 pumps the material 81 into its inlet 35 from reservoir 77 through chamber 41 of coupler 31 and then out through its outlet 65 into hose 67 and then out of gun 69. If heater wire 89 in hose 67 has not been previously energized, it is energized before material 81 is pumped out of reservoir 77 to insure that the viscosity of material 81 remains at the desired level while material 81 is being dispensed through hose 67 and out of the system through gun 69. It should be noted, however, that if the dispensing operation of material 81 is a continuous operation out of drum 81 and out of gun 69, it may not be necessary to apply heat to material 81 as it passes through standpipe 75 and hose 67. Under such conditions heater wire 85 surrounding standpipe 75 and heater wire 89 in hose 67 would not have to be energized or even provided. However, such continuous dispensing would rarely take place and material 81 would normally stand from time to time in reservoir 77 and hose 67. Thus, it is desirable and in most cases necessary to apply heat to material 81 while it is in reservoir 77 and in hose 67. Further, it is desirable, as will become apparent, that material 81 be permitted to accumulate in reservoir 77 when the apparatus is used for the first time or used the first time after a cleaning.

As material 81 is pumped out of drum 11, combined heater-follower plate 10 continuously drops further down into drum 11 to heat the material and to keep the heated material in contact with the bottom surface of combined heater-follower plate 10 so that it can be pumped out of drum 11 through hole 12 in combined heater-follower plate 10. As combined heater-follower plate 10 drops down into drum 11, wipers 33 and 35 wipe any material adhering to the sides of drum 11 down into drum 11 and these wipers provide a seal between the inside of drum 11 and combined heater-follower plate 10 so that none of the heated material will flow out around combined heater-follower plate 10 and onto its top surface.

When all the material is pumped out of drum 11, drum 11 is replaced by a new full drum. This is accomplished by merely raising combined heater-follower plate 10 out of spent drum 11 by means of telescoping rods 3 and 5, removing drum 11 from base 1 and moving the new drum with the top cover removed into place on base 1. Combined heater-follower plate is then lowered into the new drum onto the material in the drum and the process as described above is repeated. As mentioned above, it is desirable to have material stored in reservoir 77. That is, it is preferable to allow the material to accumulate in reservoir 77 such that pump 53 does not pump the material out of reservoir 77 as soon as pump 43 pumps the material into reservoir 77. By permitting enough material to accumulate in reservoir 77, the dispensing operation out of gun 69 does not have to be stopped every time a spent drum is removed and a new drum is put in place. The material that has been permitted to accumulate in reservoir 77 from the spent drum is pumped out of reservoir 77 during the drum changes operation, and if a sufficient amount of material has been allowed to accumulate in reservoir 77, material from the new drum will be pumped into reservoir 77 before the material in reservoir 77 from the previous drum has been completely pumped out of reservoir 77. In this manner an operator can continue to dispense the material out of gun 69 without stopping during drum changes.

In actual operation, material will tend to accumulate in reservoir 77; therefore, no special attention has to be paid to insure that material accumulates in reservoir 77. Gun 69 is not normally operated on a continuous basis. The operation is a stop and start operation. If pump 43 is operating during the time gun 69 is not dispensing material, it is obvious that the material will accumulate in reservoir 77. Under normal operating conditions, pump 43 would continue to operate during the time when gun 69 is not dispensing material and the material would accumulate in reservoir 77. Of course, if too much material is allowed to accumulate and over fill reservoir 77, the material will spill out over the top of reservoir 77; this cannot be permitted. Overflow valve 79 prevents the overflow of material out of reservoir 77 by disengaging slip clutch 46 when the material reaches overflow. Pump 43 is automatically cut off by the disengaging of slip clutch 46, thereby stopping the pumping of material into reservoir 77. When the level of material in reservoir 77 drops, overflow valve 79 will drop thereby reengaging slip clutch 46 to again pump material into reservoir 77 by means of pump 43. The manner in which such overflow or cutoff valves operate is well known in the art.

As has been mentioned previously, the apparatus of this invention continuously provides a uniform flow of material out of gun 69 or out of whatever type of dispenser is provided. The prior art dispensers of viscous materials do not always provide a uniform flow of material. Thus, when a bead of material is dispensed out of a dispenser such as gun 69 with the prior art dispensers, the flow of material is not uniform and therefore the bead of material will not have a uniform width along its entire length. In some cases this may be nothing more than unsightly but in many, if not most cases, the operator will have to go back and dispense more material in the areas where too little material flowed out of gun 69 and he may have to remove excess material in the areas where too much material was dispensed. This causes an unsightly and sometimes faulty finished product. The apparatus of this invention provides a uniform flow of the material throughout the system primarily by means of the slip clutches 46 and 59 as has been described. Slip clutch 46 maintains the pump pressure of pump 43 constant by providing constant torque to the input shaft of pump 43 and slip clutch 59 maintains the pump pressure of pump 53 constant by likewise providing constant torque to the input shaft of pump 43. By maintaining the pump pressure of pump 53 constant, a uniform flow of material out of gun 69 is provided and by maintaining the pump pressure of pump 43 at a high constant value and thus the flow rate of material 81 out of pump 43 uniform, de-aeration is assured. While slip clutches 46 and 59 are primarily responsible for providing the uniform flow, applicant has found that the use of these slip clutches in combination with the use of gear type pumps for pumps 43 and 53 provides uniformity of flow of the material to a very high degree as compared to the use of these slip clutches in combination with other type pumps such as piston pumps for pumps 43 and 53. Therefore, as mentioned previously, while pumps 43 and 53 may be any type pump, gear pumps are preferable. In addition, applicant has found that gear pumps appear to operate more satisfactorily and with fewer failures or pump breakdown than other type conventional well-known pumps. Thus, to provide for uniformity of flow of the material to a high degree and to provide a higher degree of reliability and performance, pumps 43 and 53 are preferably gear type pumps. With these slip clutches and gear type pumps, applicant has been able to consitently lay down a bead of material that is highly uniform in width along its entire length and has been able to continuously de-areate the material.

In summary, the material 81 is pumped out of drum 11 through de-areator cap 73 where any air present in the material is removed, into reservoir 77 and out of reservoir 77 through the dispenser which is shown as being a gun 69 in FIG. 2. Further, a uniform rate of flow of the material is provided and dispensing can be continued during changes of material containers.

From the foregoing description of the operation of the apparatus of this invention with combined heater-follower plate 10, it shuld be obvious that the operation is identical when combined heater-follower plate 2 is utilized instead of combined heater-follower plate 10. It should also be obvious that the operation of the apparatus is identical to that described above whether or not fins 22, 24 and 26 are utilized with combined heater-follower plates 2 and 10. Heat radiating fins 22, 24, and 26 merely provide additional heating surfaces and provide a concentration of the pressure on the material under the edges of the fins. Without fins 22, 24 and 26, the pressure on the material is applied by the entire bottom surface of the combined heater-follower plate and thus is essentially uniform over the entire surface of the material.

If heat radiating fins 22, 24 and 26 are used, applicant has found that the fin array pattern of FIG. 10 is a preferable array. With the fins 22, 24 and 26 sized and arranged as shown in FIGS. 9 and 10, an increase in the heating surface area is obtained with little interference to the flow of the heated material out of the drum. That is, the arrangement of fins 22, 24 and 26 permits the material to flow in a fairly free manner between the fins and out the center hole in the combined heater-follower plate. The use of more fins or all long fins tends to unduly restrict the flow of the material. Applicant experimented with various different fin sizes and arrays and found that the three different size fins arranged as shown in FIG. 10 provide ideal material flow while providing the additional heating surfaces. Thus, while the precise arrangement of fins 22, 24 and 26 shown in FIG. 10 is not critical, applicant has found this arrangement of the three different sized fins to provide good results and therefore this arrangement is the preferred arrangement.

If material 81 in drum 11 does not have to be heated follower plate 25 can be used instead of either of the two integrally fabricated combined heater-follower plates. The operation of the apparatus with follower plate 25 will be, as should be obvious, identical to the operation described above with combined heater-follower plate 10 being utilized except that no heat is applied.

If a potential user of the apparatus of this invention is certain that he will not need to dispense materials to which heat must be applied, such a user would probably purchase the apparatus with follower plate 25 since follower plate 25 is less expensive than either of the two disclosed combined heater-follower plates, and heating wire 85 and jacket 87 surrounding standpipe 75 would not have to be provided thereby further reducing the cost of the apparatus. Further, a less expensive hose than heated hose 67 could be used. The apparatus without the heating capability provides de-areation of material, uniform flow out of gun 69 or whatever dispenser is used and provides the capability of dispensing material during drum changes. However, even though the apparatus provided with either of the two combined heater-follower plates is somewhat more expensive, the apparatus with this heating capability is more versatile than the apparatus without the heating capability since material that do not require heat as well as materials that do require heat can be dispensed by the apparatus with the heating capability. If one wishes to dispense material that does not require heat he merely does not energize heating wire 89 in hose 67, heater wire 85 surrounding standpipe 75 and the heating wires in combined heater-follower plate 2 or the cartridge heaters in combined heater-follower plate 10 depending upon which one of the two embodiments of the combined heater-follower plate is provided. Therefore, the apparatus of this invention with either combined heater-follower plate or combined heater-follower plate 10 with, of course, heated hose 67 and heater wire 85 around standpipe 75 will probably be preferred by most users over the apparatus provided with just follower plate 25 and of the two disclosed embodiments of the combined heater-follower plates, combined heater-follower plate 10 will no doubt be preferred by most users over combined heater-follower plate 2 because of the ease with which cartridge heater 14 can be replaced as compared to the replacement of heater wires 6 and 8 in combined heater-follower plate 2. Of course, if a potential user plans to dispense only those materials that require heat, the apparatus of this invention with the heating capability obviously must be used.

While the invention has been described with reference to the specific structure shown in each of the various figures of the drawing, it will be obvious to those skilled in the art that various changes and modifications can be made to the structure shown in the various figures of the drawing without departing from the spirit and scope of the invention as set forth in the claims.

I claim:
1. A system for dispensing material from a container comprising:
a plate having a top surface and a bottom surface and having an aperture therethrough, said plate being shaped to fit inside a container which contains a material that is to be dispensed;
resilient wiper means surrounding said plate, said wiper means being adapted to slidably engage the inside surface of said container;
a coupler having at least a first chamber and a second chamber, said coupler being secured to said top surface of said plate such that said first chamber communicates with said aperture in said plate;
a pump having an inlet secured to said coupler in such a manner that said inlet communicates with said first chamber of said coupler and having an outlet secured to said coupler such that said outlet communicates with said second chamber of said coupler;
a hollow standpipe having a first end secured to said coupler in such a manner that said hollow standpipe communicates with said second chamber of said coupler; and
a de-aerator cap detachably coupled to said second end of said hollow standpipe, whereby said pump when operating pumps said material out of said container through said aperture in said plate, through said hollow standpipe and through said de-aerator cap to thereby remove any entrapped air from said material.

2. A system for dispensing material from a container as defined in claim 1 wherein said coupler includes a third chamber and wherein a second hollow standpipe having a first end and a second end surrounds said hollow standpipe and said de-aerator cap but is spaced apart from said hollow standpipe and said de-aerator cap to thereby form a space between the said second hollow standpipe and said hollow standpipe and said de-aerator cap, said first end of said second hollow standpipe being secured to said coupler such that said second hollow standpipe communicates with said third chamber of said coupler and being so positioned relative to said de-aerator cap that said second end of said second hollow standpipe is approximately adjacent said de-aerator cap, whereby said space between said second hollow standpipe and said hollow standpipe and said de-aerator serves as a reservoir, to receive and store said material as it is pumped through said de-aerator cap by said pump.

3. A system for dispensing material from a container as defined in claim 2 wherein means are provided for pumping said material out of said reservoir.

4. A system for dispensing material from a container as defined in claim 3 wherein said means to remove material from said reservoir comprises: a second pump having an inlet secured to said coupler such that said inlet of said second pump communicates with third chamber of said coupler and having an outlet, said material being pumped out of said reservoir into said second pump through said inlet of said second pump and out of said second pump through said outlet of said second pump when said second pump is operating.

5. A system for dispensing material from a container as defined in claim 4 including means for receiving said material from said outlet of said second pump when said second pump is operating.

6. A system for dispensing material from a container as defined in claim 5 wherein said means for receiving said material from said outlet of said second pump comprises: a hose having a first end and a second end, means to secure said first end of said hose to said outlet of said second pump and a dispensing nozzle secured to said second end of said hose, said material being pumped through said nozzle when said second pump is operating and said nozzle is open.

7. A system for dispensing material from a container as defined in claim 6 including means for moving said plate into and out of said container.

8. A system for dispensing material from a container as defined in claim 7 wherein said means for moving said plate into and out of said container comprises:
 a base plate having a first edge and a second edge opposite said first edge;
 a first vertical cylinder having an end secured to said base plate adjacent said first edge;
 a first piston vertically movable in said first cylinder;
 a second vertical cylinder having one end secured to said base plate adjacent said second edge of said base plate;
 a second piston vertically movable in said second cylinder;
 a cross-bar secured to the top end of said first piston and to the top end of said second piston, said first and second pistons being spaced apart and said cross-bar bridging the space between said first piston and said second piston;
 means to suspend said plate from said cross-bar; and
 fluid means to raise and lower said first and second rods in said first and second cylinders respectively to thereby raise and lower said cross-bar and therefore said plate suspended from said cross-bar.

9. A system for dispensing material from a container as defined in claim 8 wherein said means to suspend said plate from said cross-bar comprises:
 a first rod having a first end and a second end;
 means to secure said first end of said first rod to said cross-bar;
 means to secure said second end of said first rod to said plate;
 a second rod having a first end and a second end;
 means to secure said first end of said second rod to said cross-bar such that said second rod is spaced apart from said first rod; and
 means to secure said second end of said second rod to said plate.

10. A system for dispensing material from a container as defined in claim 9 wherein means for driving both said pump and said second pump are secured to said cross-bar.

11. A system for dispensing material from a container as defined in claim 10 wherein said means for driving both said pump and said second pump comprises:
 a first pump motor secured to said cross-bar and mechanically coupled to said pump through a first slip clutch; and
 a second pump motor secured to said cross-bar and mechanically coupled to said second pump through a second slip clutch.

12. A system for dispensing material from a container as defined in claim 11 wherein said container from which said material is to be dispensed is placed on said base plate between said first and second cylinders.

13. A system for dispensing material from a container as defined in claim 12 wherein an overflow valve is secured to said de-aerator cap and projects into said space between said second hollow standpipe and said hollow standpipe and said de-aerator cap.

14. A system for dispensing material from a container as defined in claim 13 wherein said plate is a follower plate having said top surface, said botton surface and said aperture therethrough and having said wipers secured around its periphery.

15. A system for dispensing material from a container as defined in claim 14 wherein a plurality of spiral grooves are cut into said botttom surface of said follower plate and a plurality of heating elements equal in number to said plurality of said spiral grooves are seated in said spiral grooves such that one of said plurality of heating elements is seated in each groove thereby forming an integrally fabricated heater-follower plate.

16. A system for dispensing material from a container as defined in claim 15 wherein said plurality of heating elements are heating wires.

17. A system for dispensing material from a container as defined in claim 16 wherein the number of said plurality of spiral grooves is two and the number of said plurality of heating wires is two.

18. A system for dispensing material from a container as defined in claim 17 including heating means for heating said material when said material is in said reservoir.

19. A system for dispensing material from a container as defined in claim 18 wherein said heating means for heating said material when said material is in said reservoir comprises a heating wire wrapped around said second hollow standpipe and an insulating jacket covering said heating wire.

20. A system for dispensing material from a container as defined in claim 19 wherein a heating wire is imbedded in said hose to heat said material when said material is in said hose.

21. A system for dispensing material from a container as defined in claim 14 wherein a plurality of holes are cut into said top surface of said follower plate toward said bottom surface but not through said bottom surface and wherein a plurality of cartridge heaters equal in number to said plurality of holes cut into said top surface of said follower plate are provided, a different one of said plurality of cartridge heaters being inserted into each one of said plurality of holes cut into said top surface of said follower plate thereby forming an integrally fabricated heater-follower plate.

22. A system for dispensing material from a container as defined in claim 21 including heating means for heating said material when said material is in said reservoir.

23. A system for dispensing material from a container as defined in claim 22 wherein said heating means for heating said material when said material is in said reservoir comprises a heating wire wrapped around said second hollow standpipe and an insulating jacket covering said heating wire.

24. A system for dispensing material from a container as defined in claim 23 wherein a heating wire is imbedded in said hose to heat said material when said material is in said hose.

25. A system for dispensing material from a container as defined in claim 24 wherein said number of said plurality of holes cut into said top surface of said follower plate is a multiple of three and wherein the number of said plurality of cartridge heaters is a multiple of three.

26. A system for dispensing material from a container as defined in claim 25 wherein the number of said plurality of holes cut into the top surface of said follower plate is twenty-one and the number of said plurality of cartridge heaters is twenty-one.

27. A system for dispensing material from a container as defined in claim 13 wherein said plate is an integrally fabricated heater-follower plate having said top surface, said bottom surface and said aperture therethrough and having said wipers secured around its periphery.

28. A system for dispensing material from a container as defined in claim 26 wherein means are provided to heat said reservoir and wherein means are provided for heating said hose.

29. A system for dispensing material from a container as defined in claim 27 wherein a plurality of heat radiating fins are secured to said bottom surface of said integrally fabricated heater-follower plate in a defined pattern.

30. A system for dispensing material from a container as defined in claim 15 wherein a plurality of heat radiating fins are secured to said bottom surface of said integrally fabricated heater-follower plate in a defined pattern.

31. A system for dispensing material from a container as defined in claim 21 wherein a plurality of heat radiating fins are secured to said bottom surface of said integrally fabricated heater-follower plate in a defined pattern.

32. In a system for dispensing hot melt material from a container, an integrally fabricated heater-follower plate comprising:
- a plate having a top surface and a bottom surface;
- an aperture cut through said plate at approximately the center of said plate;
- a plurality of grooves cut into the edge of said plate around its entire periphery;
- a plurality of wipers equal in number to said plurality of grooves, a different one of said plurality of wipers being secured in each one of said plurality of grooves;
- a plurality of spiral grooves cut into said bottom surface of said plate; and
- a plurality of heating wires, a different one of said plurality of heating wires being placed into each one of said plurality of spiral grooves.

33. In a system for dispensing hot melt material from a container, an integrally fabricated heater-follower plate comprising:
- a plate having a top surface and a bottom surface;
- an aperture cut through said plate at approximately the center of said plate;
- a plurality of grooves cut into the edge of said plate around its entire periphery;
- a plurality of wipers equal in number to said plurality of grooves, a different one of said plurality of wipers being secured in each one of said plurality of grooves;
- a plurality of holes cut into said top surface of said plate toward said bottom surface of said plate but not through said bottom surface of said plate; and
- a plurality of cartridge heaters equal in number to said plurality of holes cut into said top surface of said plate, a different one of said cartridge heaters being inserted into each one of said plurality of holes cut into said top surface of said plate.

34. A method for dispensing material from a container comprising the steps of:
- a. placing a follower plate into a container that contains a material that is to be dispensed and on top of said material;
- b. pumping said material out of said container through said follower plate;
- c. pumping said material pumped out of said container through a de-aerator;
- d. accumulating a given amount of said material in said reservoir; and
- e. pumping said material out of said reservoir at a given rate while at the same time pumping material through said de-aerator at a different rate into said reservoir.

35. A method for dispensing a hot melt material stored in a container comprising the steps of:
- a. placing an integrally fabricated heater-follower plate into a container which contains a hot melt material that is to be dispensed and on top of said hot melt material;
- b. applying heat to said hot melt material in said container;
- c. pumping said heated hot melt material out of said container through said heater-follower plate, through a de-aerator into a reservoir;
- d. accumulating a given amount of said heated hot melt material in said reservoir;
- e. applying heat to said material accumulated in said reservoir;
- f. pumping said material out of said reservoir through a hose while at the same time pumping said heated hot melt material from said container through said de-aerator into said reservoir; and 'g. applying heat to said hose.

* * * * *